US 6,618,454 B1

(12) United States Patent
Agrawal et al.

(10) Patent No.: US 6,618,454 B1
(45) Date of Patent: Sep. 9, 2003

(54) DIVERSITY CODED OFDM FOR HIGH DATA-RATE COMMUNICATION

(75) Inventors: Dakshi Agrawal, Champaign, IL (US); Ayman F. Naguib, New Providence, NJ (US); Nambirajan Seshadri, Chatham, NJ (US); Vahid Tarokh, Hackensack, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/213,585

(22) Filed: Dec. 17, 1998

Related U.S. Application Data
(60) Provisional application No. 60/073,922, filed on Feb. 6, 1998.

(51) Int. Cl.$^7$ .................................................. H04B 7/10
(52) U.S. Cl. ....................................... 375/347; 375/341
(58) Field of Search ............................... 375/295, 316,
375/267, 260, 347, 299, 340, 341; 370/203,
208, 210; 714/792, 794, 786, 752

(56) References Cited

U.S. PATENT DOCUMENTS

| | | | | | |
|---|---|---|---|---|---|
| 4,881,241 | A | * | 11/1989 | Pommier et al. | 375/260 |
| 5,729,526 | A | * | 3/1998 | Yoshida | 370/206 |
| 5,867,478 | A | * | 2/1999 | Baum et al. | 370/208 |
| 5,914,933 | A | * | 6/1999 | Cimini et al. | 370/208 |
| 5,973,642 | A | * | 10/1999 | Li et al. | 342/378 |
| 6,144,711 | A | * | 11/2000 | Raleigh et al. | 375/347 |
| 6,208,669 | B1 | * | 3/2001 | Cimini et al. | 370/203 |
| 6,292,917 | B1 | * | 9/2001 | Sinha et al. | 375/299 |
| 6,351,499 | B1 | * | 2/2002 | Paulraj et al. | 375/267 |
| 6,353,637 | B1 | * | 3/2002 | Mansour et al. | 370/536 |

* cited by examiner

Primary Examiner—Tesfaldet Bocure

(57) ABSTRACT

Orthogonal Frequency Division Multiplexing (OFDM) is combined with a plurality of transmitting antennas to yield a system that provides space, frequency and time diversity. Specifically, an arrangement is created where a transmitter includes a plurality of antennas that are transmitting simultaneously over the same frequency subbands, and the symbols that are transmitted over each subband, in any given time slot, over the different antennas are encoded to provide diversity. The principles of trellis coding, space-time coding, or any other diversity-producing coding can be applied in this arrangement.

2 Claims, 2 Drawing Sheets

US 6,618,454 B1

DIVERSITY CODED OFDM FOR HIGH DATA-RATE COMMUNICATION

REFERENCE TO RELATED APPLICATIONS

This application claims the benefit of U.S. Provisional Application No. 60/073,922, filed Feb. 6, 1998.

BACKGROUND OF THE INVENTION

This invention relates to transmission systems and more particularly, to digital transmission systems using orthogonal frequency division multiplexing (OFDM). This invention also relates to a transmitter and receiver adapted to such a system.

Recently there has been an increasing interest in providing high data-rate services such as video-conferencing, multi-media Internet access and wide area network over wide-band wireless channels. Wideband wireless channels available in the PCS band (2 GHz) have been envisioned to be used by mobile (high Doppler) and stationary (low Doppler) units in a variety of delay spread profiles. This is a challenging task, given the limited link power budget of mobile units and the severity of wireless environment, and calls for the development of novel robust bandwidth efficient techniques that work reliably at low SNRs.

The OFDM transmission system is a variation of the multiple carrier modulation system. FIG. 1 depicts a conventional OFDM system. A frame of bits is applied to serial-to-parallel converter 10 where it is divided into n multi-bit complex symbols $c_1$ through $c_a$ and delivered simultaneously to inverse Fourier transformer 20. Discrete Fourier transformer 20 develops a time signal that corresponds to a plurality of individual carrier signals which are amplitude modulated by symbols $c_1$ through $c_a$. This signal is modulated up to the desired band by amplitude modulator 30, and transmitted.

At the receiver, the received signal is modulated down to baseband by converter 40, and applied to discrete Fourier transformer 50. Transformer 50 performs the inverse operation of Fourier transformer 20 and, thereby (in the absence of corruption stemming from noise), recovers symbols $c_1$ through $c_a$. A parallel to serial converter 60 reconstitutes the serial flow of symbols $c_1$ through $c_a$ and converts the symbols to individual bits.

Separately, space-time coding was recently introduced for narrowband wireless channels U.S. patent applications having the Ser. Nos. 09/063,765, 08/847,635 and 08/114,838, are examples of such systems. These systems encode the signals and employ both time and space diversity to send signals and to efficiently recover them at a receiver. That is, a set of symbols is encoded, for example in various permutations, and the encoded signals are transmitted over a number of antennas (providing the space diversity) and a number of time slots (providing time diversity). Of course, that requires use of a number of time slots for each set of symbols. For channels with slowly varying channel characteristics, where it can be assumed that the characteristics do not change from frame to frame, the decoding process can be simplified.

SUMMARY OF THE INVENTION

An advance in the art is achieved by employing the principles of Orthogonal Frequency Division Multiplexing (OFDM) in combination with a plurality of transmitting antennas. That is, an arrangement is created where a transmitter includes a plurality of antennas that are transmitting simultaneously over the same frequency subbands, and the symbols that are transmitted over each subband, in any given time slot, over the different antennas are encoded to provide diversity. The principles of trellis coding, space-time coding, or any other diversity-producing coding can be applied in this arrangement. Illustratively, each given subband being transmitted out of the plurality of transmitting antenna can be treated as belonging to a space-time encoded arrangement and the symbols transmitted over the given subband can then be encoded in block of p×n symbols, where n is the number of transmitting antennas, and p is the number of time slots over which the block of symbols is transmitted.

DETAILED DESCRIPTION

Figure 1:
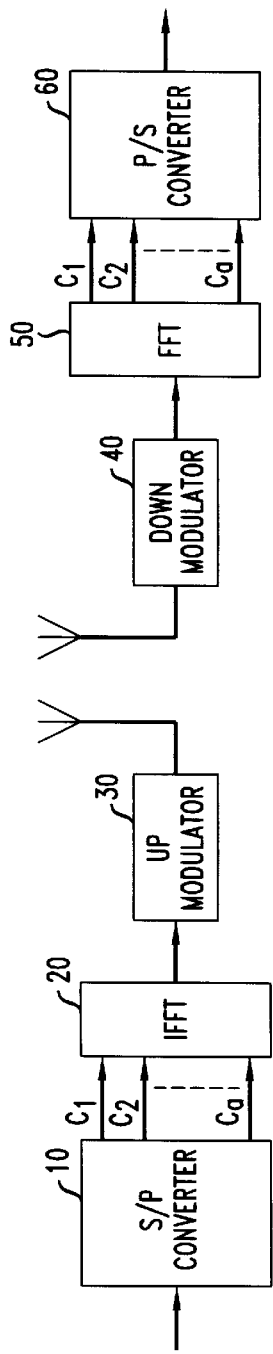
FIG. 1 illustrates a prior art OFDM arrangement.
Figure 2:
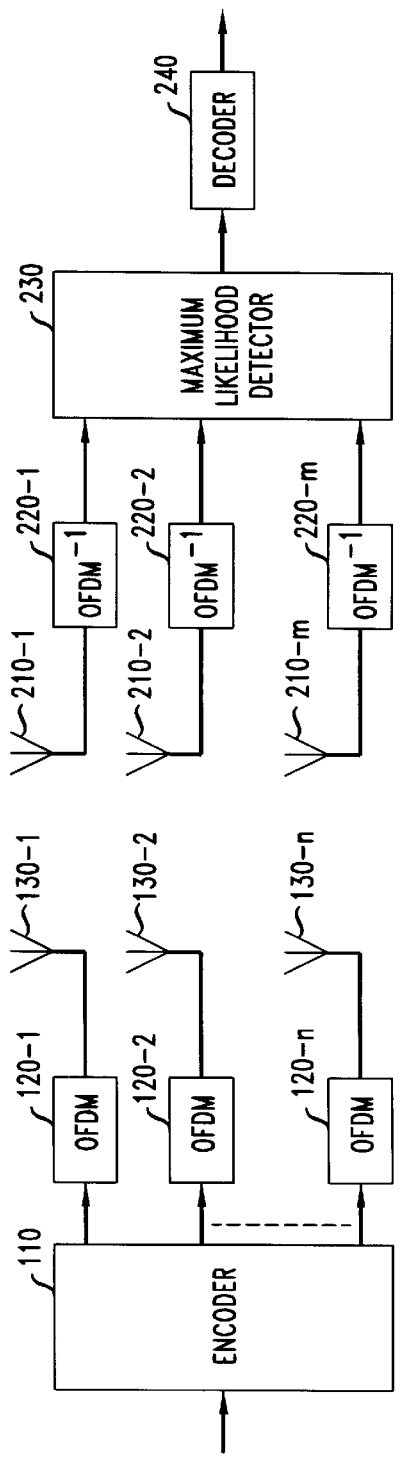
FIG. 2 presents an OFDM arrangement in accordance with the principles disclosed herein.

FIG. 2 depicts an arrangement in conformance with the principles of this invention, where a transmitter 100 employs a plurality of n transmitting antennas and a receiver 200 employs a plurality of m receiving antennas. Incoming data is applied to block encoder 110, which encodes the data and develops n signal streams. Each of the n signal streams of encoder 110 is applied to an associated OFDM transmitter 120-$i$ (which includes an IFFT circuit) and, thence to antenna 130-$i$, where $i=1,2,\ldots,n$.

The receiver comprises antennas 210-$j$ that feed received signals to receivers 220-$j$, where $j=1,2,\ldots,m$. The received signal of each antenna j is applied to an FFT circuit 230-$j$ (corresponding to the IFFT circuits within the transmitter) that develops individual signals. Those signals are applied to maximum likelihood decoder 240. In practice, the numbers of transmit and receive antennas are constrained by cost—particularly on mobile units.

In an OFDM arrangement, the total available bandwidth is divided into l subbands and, typically, the number of subbands is a power of 2 and is quite large. It is expected that in applications of this invention, a case where l=1024 and n<10 would not be unusual.

In accordance with the principles disclosed herein, at any given time slot, the transmitter of FIG. 2 can transmit information corresponding to n×l×q bits. Whether encoder 110 receives those bits from a storage element, or from a real-time source is irrelevant. It forms symbols from groups of q bits and thus develops a collection of n×l symbols $$c_{1,0} \ldots c_{n,0} c_{1,1} \ldots c_{n,1} \ldots c_{1,l-1} \ldots c_{n,l-1}. \tag{1}$$

This collection can be thought to comprise l sets of symbols $c_{1,i}, c_{2,i} \ldots c_{n,i}$ that are applied to the n transmitter antennas. It can also be thought to comprise n sets of symbols $c_{i,0} c_{i,1} \ldots c_{i,l-1}$, where each set is transmitted over a different antenna. Of course, these symbols can be rearranged in any desired manner, allowing any of the n×l symbols to be transmitted over any of the n antenna in any of the l frequency subbands. To perform the actual transmission, the symbols applied to transmitters 120-$i$, $i=1,2,\ldots,n$ are modulated in a selected manner, for example, using an M-point PSK constellation, and delivered to respective antennas 103-$i$. The particular modulation schema selected is outside the scope of this invention.

The reader would readily realize that while the above disclosure is couched in terms of a particular time slot, time is another parameter, or dimension that is available to the FIG. 2 arrangement. Consequently, the reader should realize that the FIG. 2 arrangement provides an ability to transmit a three-dimensional array of symbols using three independent resources: space (the different antennas) frequency (the different subbands) and time intervals.

While n×l×q bits can be transmitted during any given time slot, and a subsequent time slot can transmit another set of n×l×q bits, it is not necessarily best to employ the FIG. 2 arrangement in a manner utilizes the full throughput potential of the arrangement, for the reasons explained below. Realizing that transmission channels introduce attenuation and noise (and particularly so when the channel is wireless) it makes sense to reduce the throughput of the system and to employ the unused capacity to enhance the proper detection of the transmitted signal, even in the presence of noise. Thus, in accordance with one aspect of this disclosure, encoder 110 is charged with developing sets of n×l symbols that are encoded for increased robustness. This encoding can be any known encoding, such as Reed Solomon codes, Trellis codes, Block codes, etc. Also, this encoding can be within each of the aforementioned l sets of symbols $c_{1,i}, c_{2,i} \ldots c_{n,i}$ that are applied to the n transmitter antennas, within each of the n sets of symbols $c_{i,0} c_{i,1} \ldots c_{i,l-1}$ that are transmitted over a given antenna, can be across time slots, and any combination of the above.

In other words, a given set of encoded symbols may occupy one dimension, two dimensions, or all three dimensions.

As mentioned above, encoding in the space and time dimensions has been disclosed earlier, for example, in the aforementioned U.S. Patent application No. 08/847,635. It may be noted here that, in one sense, the ability to transmit, at any instant, over the two independent dimensions of space and frequency channels, is equivalent to the two independent channels that are employed in the space-time encoding art. Specifically, frequency and time are equivalent in the sense that the different frequency channels are orthogonal to each other, just as the different time intervals are orthogonal to each other. The advantage of employing the space-frequency dimensions rather than the space-time dimensions lies in the fact that the space-time dimensions introduce a delay in the decoder, because signals from a plurality of time slots need to be accumulated before the sequence can be decoded. The disadvantage of employing the space-frequency dimensions rather than the space-time dimensions lies in the fact that the channel transfer functions do not vary much from time slot to time slot, and this allows a simplification in the decoder's algorithm. In contra-distinction, the channel transfer functions do vary from frequency to frequency (and are not stable), preventing the simplifications that can otherwise be achieved.

Still, block coding can be usefully employed in the FIG. 2 arrangement and, indeed, the benefits of space-time coding can be garnered by employing the time dimension. Illustratively, for each frequency subband in the FIG. 2 arrangement, the n antennas and successive time slots can be employed as a space-time block encoding system. Thus, p×n space-time encoded blocks can be employed, with p time slots employed to transmit the block. Also, p×(n·N) blocks can be employed, where p corresponds to the time slots employed, n is the number of antennas, and N is the number of frequency subbands over which the encoded block is spread. To illustrate a trellis-encoding implementation, it may be recalled that a trellis encoder generates a sequence of symbols in response to an incoming sequence of symbols in accordance with a prescribed trellis graph. The trellis-encoded sequence can be spread over the n antennas, over the l frequency subbands, or even over a plurality of time slots, basically in any manner that an artisan might desire. In short, the above are but a few examples of the different encoding approaches that can be employed.

The signal at each receive antenna is a noisy version of the superposition of the faded versions of the n transmitted signals, at the l subbands. When demodulated, the output of receiver 220-j, for j=1,2, . . . ,m, is given by:

$$r_{j,k} = \sum_{i=1}^{n} h_{i,j,k} c_{i,k} + n_{j,k} \quad \text{for } k = 1, 2, \ldots, l-1, \qquad (2)$$

where the $h_{i,j,k}$ terms are the channel transfer function of the channel from transmit antenna 130-i to receive antenna 210-j, at k-th frequency subband (kF/l), and $n_{j,k}$ are independent samples of a Gaussian random variable with variance $N_0$. Applying the received signal of antenna j to FFT circuit 230-j yields the individual subband signals $r_{j,k}$ for k=1,2, . . . ,l-1

When the $h_{i,j,k}$ terms are known, a maximum likelihood (ML) detection algorithm at the decoder for decoding symbols arriving at any one time slot amounts to computing $$\hat{c} = \operatorname{argmin} \sum_{j=1}^{m} \sum_{k=0}^{l-1} \left| r_{j,k} - \sum_{i=1}^{n} h_{i,j,k} \tilde{c}_{i,k} \right|^2, \qquad (3)$$

where $\tilde{c}_{i,k}$ is the symbol hypothesized to have been transmitted by antenna i over frequency subband k and ĉ is the estimated sequence of symbols that was sent by the transmitter.

Figure 3:
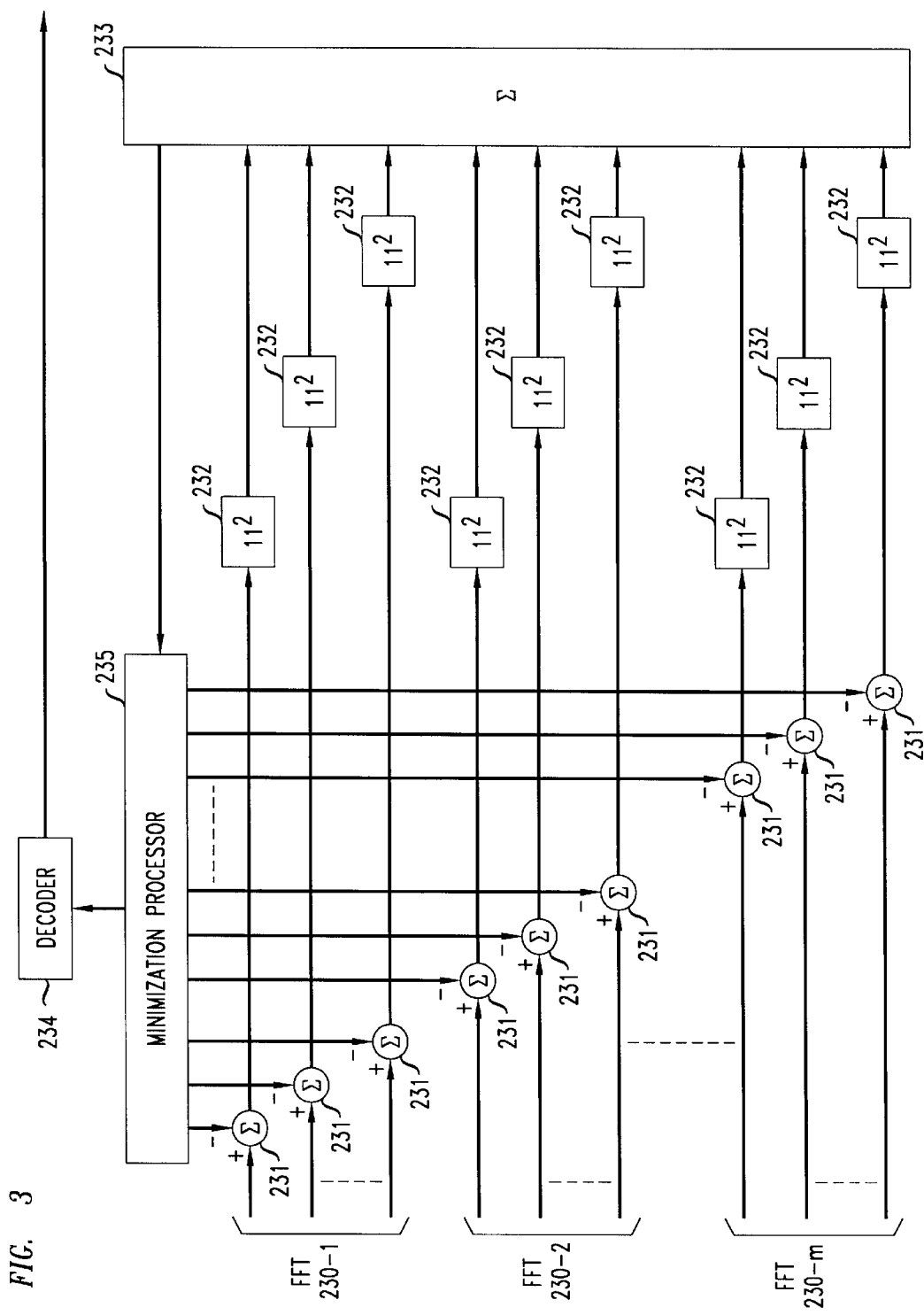
FIG. 3 shows details of the FIG. 2 receiver.

FIG. 3 depicts a maximum likelihood detector that carries out the process called for by equation (3), without taking account of any simplifications in the detection algorithm that might arise from the particular decoding employed in the transmitter. Signal $r_{l,l}$, is applied to subtractor 231, which is also supplied with signal $$\sum_{i=1}^{n} h_{i,1,1} \tilde{c}_{i,1}$$

from minimization processor 235. The difference signal is applied magnitude circuit 232, and the output of magnitude circuit 232 is applied to combiner circuit 233. Similar processing is undertaken for each output signal of FFT circuit 230-1, as well as for the output signals of the other FFT circuits 230-j. Consequently, the output of combiner circuit 233 corresponds to $$\sum_{j=1}^{m} \sum_{k=0}^{l-1} \left| r_{j,k} - \sum_{i=1}^{n} h_{i,j,k} \tilde{c}_{i,k} \right|^2. \qquad (4)$$

This signal is applied to minimization processor 235, which stores the applied value, chooses another set of symbols, creates corresponding signals $$\sum_{i=1}^{n} h_{i,j,k} \tilde{c}_{i,k},$$

applies these signals to the various subtractors 231, and repeats the process of developing an output signal of combiner 233. This cycle repeats through the various possible values of $\tilde{c}_{i,k}$ until a set is identified that yields the minimum value for equation (4). The symbols so selected are then applied to decoding circuit 234, if necessary, to recover the signals that were encoded by encoder 110.

Equation (4) is, of course, a general equation, and it does not take into account the special attributes that result whatever coding is employed in the transmitter. When the orthogonal coding described above in connection with the 09/111,111 application is employed as described, a simplified "maximum likelihood detection" algorithm results.

As indicated above, the values of $h_{i,j,k}$ are presumed known. They may be ascertained, through a training session in a conventional manner, and this process of obtaining the values of $h_{i,j,k}$ does not form a part of this invention. A technique that updates the $h_{i,j,k}$ values based on received signals is disclosed in a copending application, which is filed concurrently therewith.

We claim:
1. A receiver comprising:
   m OFDM receivers, where m is an integer greater than 1, each developing a set of symbols;
   a maximum likelihood detector responsive to said m OFDM receivers; and
   a decoder responsive to said maximum likelihood detector that includes
      a minimization processor;
      a plurality of subtractors responsive to said sets of symbols developed by said m OFDM receivers, and to signals supplied by said minimization processor;
      magnitude computation circuits responsive to said subtractors; and
      a combining circuit responsive to said magnitude computation circuits for developing a signal that is applied to said minimization processor.
2. The receiver of claim 1 further comprising a decoder responsive to said minimization processor.

* * * * *